(12) United States Patent  (10) Patent No.: US 8,205,376 B1
Hughes  (45) Date of Patent: Jun. 26, 2012

(54) SYSTEM FOR CARRYING AND CHANGING PRE-RIGGED FISH HOOKS

(76) Inventor: Jeffrey W. Hughes, Shelburne, VT (US)

( * ) Notice: Subject to any disclaimer, the term of this patent is extended or adjusted under 35 U.S.C. 154(b) by 193 days.

(21) Appl. No.: 12/378,237

(22) Filed: Feb. 12, 2009

(51) Int. Cl.
A01K 97/06 (2006.01)

(52) U.S. Cl. ...... 43/57.2; 43/57.1; 43/54.1; 206/315.11; 224/920; 224/661; 224/604

(58) Field of Classification Search ............... 43/57.2, 43/57.1, 54.1, 44.98; 224/661, 149, 150, 224/920, 660, 604, 605, 623, 637, 638; 206/315.11, 206/459.5, 534; 40/642.02, 657; 209/547, 209/555; 211/10; 235/90; 273/264; 434/96, 434/128, 407
See application file for complete search history.

(56) References Cited

U.S. PATENT DOCUMENTS

| | | | | |
|---|---|---|---|---|
| 556,982 A * | 3/1896 | Howe | | 43/57.1 |
| 787,217 A * | 4/1905 | Plank | | 43/57.1 |
| 869,614 A * | 10/1907 | Bennett | | 43/57.1 |
| 1,133,846 A * | 3/1915 | Fath | | 43/57.2 |
| 1,208,945 A * | 12/1916 | Gell et al. | | 43/54.1 |
| 1,292,728 A * | 1/1919 | Dozier | | 224/661 |
| 1,302,312 A * | 4/1919 | Cook | | 224/920 |
| 1,339,194 A * | 5/1920 | Grammich | | 211/10 |
| 1,586,058 A * | 5/1926 | Winfield | | 43/54.1 |
| 1,591,297 A * | 7/1926 | Dumouchel | | 43/57.1 |
| 1,749,227 A * | 3/1930 | Pruett | | 43/57.2 |
| 2,041,232 A * | 5/1936 | Collins | | 43/57.2 |
| 2,098,636 A * | 11/1937 | Smith et al. | | 43/54.1 |
| 2,156,740 A * | 5/1939 | Schweigert | | 43/57.1 |
| 2,260,069 A * | 10/1941 | Whitson | | 235/90 |
| 2,474,752 A * | 6/1949 | Montgomery | | 43/57.1 |
| 2,493,344 A * | 1/1950 | Hamel | | 43/57.2 |
| 2,514,451 A * | 7/1950 | Hyman | | 43/57.1 |
| 2,537,730 A * | 1/1951 | Anderson | | 43/57.1 |
| 2,566,388 A * | 9/1951 | Waggoner | | 43/57.2 |
| 2,576,559 A * | 11/1951 | Bennek | | 224/149 |
| 2,578,424 A * | 12/1951 | Hart | | 43/57.2 |
| 2,624,973 A * | 1/1953 | Wilcox et al. | | 43/57.2 |
| 2,657,497 A * | 11/1953 | Beaver | | 43/57.1 |
| 2,659,997 A * | 11/1953 | Guestinger | | 43/57.2 |
| 2,723,485 A * | 11/1955 | Pederson | | 43/57.1 |
| 2,750,706 A * | 6/1956 | Seals | | 43/57.2 |
| 2,762,157 A * | 9/1956 | Tompkins | | 43/57.2 |
| 2,826,853 A * | 3/1958 | Guy et al. | | 43/57.1 |
| 2,834,144 A * | 5/1958 | Jones | | 43/54.1 |

(Continued)

FOREIGN PATENT DOCUMENTS

DE 4341051 C1 * 5/1995

(Continued)

*Primary Examiner* — Darren W Ark

(74) *Attorney, Agent, or Firm* — Thomas G. Ference

(57) ABSTRACT

A system for carrying and changing pre-rigged fish hooks comprising a fish hook carrying device including a flexible support structure having a hook retainer end and line retainer end. The hook retainer end includes a fish hook retainer and the line retainer end includes a plurality of sleeves. Each separate sleeve is for accepting a weight attached to the line of a different pre-rigged fish hook. Each separate weight provides a constant downward straightening force on the line to which it is attached when the carrying device is flexed by a fisherman. The system may further include pairs of indicia, one on the hook retainer and one on a corresponding sleeve, to aid a visually impaired fisherman to keep the line of each pre-rigged fish hook untangled along the support structure.

10 Claims, 10 Drawing Sheets

U.S. PATENT DOCUMENTS

| | | | | |
|---|---|---|---|---|
| 2,879,619 | A | * | 3/1959 | Peterson ............... 43/57.2 |
| 2,952,461 | A | * | 9/1960 | Boulanger ............... 235/90 |
| 2,999,621 | A | * | 9/1961 | Kiser ............... 43/57.1 |
| 3,032,914 | A | * | 5/1962 | Valle ............... 43/57.2 |
| 3,115,723 | A | * | 12/1963 | Kline ............... 43/57.2 |
| 3,122,855 | A | * | 3/1964 | Collier ............... 43/57.2 |
| 3,172,228 | A | * | 3/1965 | Freeman ............... 43/57.1 |
| 3,255,550 | A | * | 6/1966 | Valle ............... 43/57.2 |
| 3,350,810 | A | * | 11/1967 | Warner et al. ............... 43/57.1 |
| 3,668,802 | A | * | 6/1972 | Benward ............... 43/57.1 |
| 3,713,244 | A | * | 1/1973 | Alotta ............... 43/57.2 |
| 3,747,258 | A | * | 7/1973 | Maciel ............... 43/57.1 |
| 3,832,798 | A | * | 9/1974 | Pilston ............... 43/57.2 |
| 3,859,747 | A | * | 1/1975 | Proebstle ............... 43/54.1 |
| 3,897,650 | A | * | 8/1975 | Pilston ............... 43/54.1 |
| 3,985,227 | A | * | 10/1976 | Thyen et al. ............... 206/63.3 |
| 4,005,541 | A | * | 2/1977 | Henrichsen ............... 43/57.2 |
| 4,063,734 | A | * | 12/1977 | Taylor ............... 273/264 |
| 4,073,328 | A | * | 2/1978 | Franklin ............... 206/315.11 |
| 4,103,807 | A | * | 8/1978 | Lyon et al. ............... 224/661 |
| 4,210,337 | A | * | 7/1980 | Obermair ............... 273/264 |
| 4,243,140 | A | * | 1/1981 | Thrun ............... 206/459.5 |
| 4,281,470 | A | * | 8/1981 | Anderson ............... 43/57.1 |
| 4,349,338 | A | * | 9/1982 | Heppler ............... 206/459.5 |
| 4,383,385 | A | * | 5/1983 | Myers ............... 43/57.1 |
| 4,389,806 | A | * | 6/1983 | Herring ............... 43/57.1 |
| 4,442,939 | A | * | 4/1984 | Downing ............... 206/345 |
| 4,473,156 | A | * | 9/1984 | Martin ............... 206/534 |
| 4,513,526 | A | * | 4/1985 | Grace et al. ............... 43/57.2 |
| 4,516,707 | A | * | 5/1985 | Crapanzano ............... 43/57.1 |
| 4,528,772 | A | * | 7/1985 | Schaefers ............... 43/57.1 |
| 4,577,433 | A | * | 3/1986 | Jones ............... 43/57.2 |
| 4,631,856 | A | * | 12/1986 | Born ............... 43/57.2 |
| 4,691,469 | A | * | 9/1987 | Alsobrook et al. ............... 43/54.1 |
| 4,815,610 | A | * | 3/1989 | Borick et al. ............... 206/459.5 |
| 4,831,771 | A | * | 5/1989 | Hoffken ............... 43/54.1 |
| D301,615 | S | * | 6/1989 | Vitart-Liva ............... D24/226 |
| 4,846,351 | A | * | 7/1989 | Gardiner ............... 206/459.5 |
| 4,874,084 | A | * | 10/1989 | Strausser ............... 206/459.5 |
| 4,961,281 | A | * | 10/1990 | Listebarger, Jr. ............... 43/57.2 |
| 4,980,988 | A | * | 1/1991 | Whitman ............... 43/54.1 |
| 5,005,711 | A | * | 4/1991 | Peatross et al. ............... 211/70.7 |
| 5,018,298 | A | * | 5/1991 | Spears ............... 43/57.2 |
| 5,077,927 | A | * | 1/1992 | Derryberry ............... 43/54.1 |
| 5,095,645 | A | * | 3/1992 | Borawski ............... 43/57.1 |
| 5,203,453 | A | * | 4/1993 | Dirito ............... 224/921 |
| 5,251,751 | A | * | 10/1993 | Prussen ............... 206/459.5 |
| 5,269,090 | A | * | 12/1993 | Richards et al. ............... 43/57.2 |
| 5,282,558 | A | * | 2/1994 | Martinez ............... 224/150 |
| 5,337,511 | A | * | 8/1994 | Ashbaugh ............... 43/57.1 |
| 5,357,707 | A | * | 10/1994 | Lewis ............... 43/57.2 |
| 5,388,547 | A | * | 2/1995 | Lehr et al. ............... 43/1 |
| 5,501,030 | A | | 3/1996 | Markle, Jr. |
| 5,535,541 | A | * | 7/1996 | Fisher ............... 43/57.1 |
| 5,601,288 | A | * | 2/1997 | White et al. ............... 273/271 |
| 5,655,330 | A | * | 8/1997 | Parsons, III ............... 43/124 |
| 5,815,979 | A | * | 10/1998 | George ............... 43/57.2 |
| 5,833,054 | A | * | 11/1998 | Graves ............... 206/38.1 |
| 5,850,917 | A | * | 12/1998 | Denton et al. ............... 206/443 |
| 5,941,017 | A | * | 8/1999 | Junck et al. ............... 43/57.2 |
| 5,941,394 | A | * | 8/1999 | Siegler ............... 206/534 |
| 5,979,752 | A | * | 11/1999 | Holloway ............... 43/4 |
| 6,029,872 | A | * | 2/2000 | Ellington ............... 224/661 |
| 6,101,755 | A | * | 8/2000 | Kent ............... 43/44.98 |
| 6,132,416 | A | * | 10/2000 | Broselow ............... 604/506 |
| 6,185,850 | B1 | * | 2/2001 | Erkel ............... 40/657 |
| 6,189,158 | B1 | * | 2/2001 | Lehoux ............... 224/661 |
| 6,219,958 | B1 | * | 4/2001 | Eberts ............... 43/57.2 |
| 6,312,067 | B1 | * | 11/2001 | Blanchard et al. ............... 40/657 |
| 6,325,374 | B1 | * | 12/2001 | Burger et al. ............... 273/264 |
| 6,367,190 | B1 | * | 4/2002 | Looney et al. ............... 43/57.1 |
| 6,530,488 | B1 | * | 3/2003 | Krammes, Jr. ............... 43/54.1 |
| D479,329 | S | * | 9/2003 | Sanguinetti ............... D24/128 |
| 6,618,981 | B1 | * | 9/2003 | Rodriguez ............... 43/54.1 |
| 6,685,066 | B2 | * | 2/2004 | Cragg ............... 224/661 |
| D489,454 | S | * | 5/2004 | Koseki ............... D24/131 |
| 6,962,020 | B2 | * | 11/2005 | Gonzalez ............... 43/57.2 |
| 7,066,328 | B2 | * | 6/2006 | Pulsifer ............... 206/363 |
| 7,246,705 | B2 | * | 7/2007 | Kaltz et al. ............... 206/589 |
| 7,284,349 | B1 | * | 10/2007 | Sala ............... 43/57.2 |
| 7,380,367 | B1 | * | 6/2008 | Andrews ............... 43/57.1 |
| D622,620 | S | * | 8/2010 | Cloonan ............... D10/46.1 |
| 7,798,330 | B2 | * | 9/2010 | Noble et al. ............... 206/538 |
| 7,857,138 | B2 | * | 12/2010 | Temple ............... 206/571 |
| 7,886,908 | B2 | * | 2/2011 | Farrar et al. ............... 206/459.5 |
| 7,937,882 | B2 | * | 5/2011 | Mullins ............... 43/54.1 |
| 2003/0182845 | A1 | | 10/2003 | Pfeffer |
| 2005/0172540 | A1 | * | 8/2005 | Mizen ............... 43/44.98 |
| 2007/0023467 | A1 | * | 2/2007 | Spreer ............... 224/149 |
| 2008/0134566 | A1 | * | 6/2008 | Greaves et al. ............... 43/57.2 |
| 2009/0230013 | A1 | * | 9/2009 | Born et al. ............... 206/534 |
| 2010/0326250 | A1 | * | 12/2010 | Parr ............... 206/459.1 |

FOREIGN PATENT DOCUMENTS

| | | | | |
|---|---|---|---|---|
| GB | 2224190 | A | * | 5/1990 |
| GB | 2392074 | A | * | 2/2004 |
| GB | 2460449 | A | * | 12/2009 |
| JP | 10215747 | A | * | 8/1998 |
| JP | 2002153186 | A | * | 5/2002 |
| JP | 2003052290 | A | * | 2/2003 |
| JP | 2003235423 | A | * | 8/2003 |
| JP | 2005204552 | A | * | 8/2005 |
| JP | 2005269964 | A | * | 10/2005 |
| JP | 2008099626 | A | * | 5/2008 |

* cited by examiner

SYSTEM FOR CARRYING AND CHANGING PRE-RIGGED FISH HOOKS

FIELD OF THE INVENTION

This invention relates generally to a system for managing pre-rigged fish hooks. In particular, the present invention is directed to a combination of a carrying device and visual identifiers to aid a fisherman in rapidly locating and changing lined fish hooks. More specifically, the system includes attaching a weight to the line of each pre-rigged fish hook and placing each weight in a separate sleeve to keep the line of each pre-rigged fish hook substantially straight and untangled from other pre-rigged fish hooks.

BACKGROUND OF THE INVENTION

All fishermen, and especially fly fishermen, spend considerable time replacing hooks, straightening leaders, changing lines, tying knots, rigging dropper hooks and untangling lined fish hooks. When conditions are ideal, these procedures are minor inconveniences. Conditions are rarely ideal, however, and these procedures are made more difficult by complications such as poor eyesight, poor finger dexterity, lack of experience, use of a small hook, or use of a line that has not been adequately straightened. Environmental factors such as wind, rain, dim light, and biting insects also complicate the execution of these seemingly simple procedures.

Various devices such as clippers, needle threaders, forceps, knot tyers, snaps, swivels, magnifying lenses, and leader straighteners can be used to facilitate fishing procedures. Typically, these devices are stored and carried in a tackle box, fishing vest, or pack. When all goes well, a fisherman is able to find, access, use, and return each device to its storage location before losing it or dropping it into the water. Executing these fishing procedures is tedious and time consuming, and as the number of employed devices increases, so does the likelihood of lost or misplaced equipment.

One approach that solves most of these complicating factors is to pre-rig tippets (short lines) with whichever fish hooks, jigs, flies, or dropper hooks the fisherman wishes to use during a fishing outing. Rigging hooks with tippets before a fishing outing enables the fisherman to execute the procedures of knot tying, dropper hook preparation, and straightening of tippets in the most favorable environment possible. Rigging tippets to hooks before, rather than during, a fishing outing also enables the fisherman to seek assistance from others, or to employ effective but cumbersome devices that facilitate knot tying and tippet straightening. In so doing, the fisherman is spared the need to have these devices on his body while fishing.

Hooks that are pre-rigged with tippets, leaders or snells, especially those that include dropper hooks, are difficult or cumbersome to carry without entanglement. A number of prior art inventions have attempted to address this problem, but each prior art has shortcomings that limit its widespread usefulness. For example, elastic loops and tension springs have been employed in cooperation with a rigid platform to hold and straighten short tippets. These prior art structures are only suitable for hooks with very short tippets, and because of their stiff platform, they are cumbersome to carry if longer than a few inches in length. Others have attempted to solve the problem of carrying longer tippets. These prior art structures usually employ wrapping, coiling, winding or folding of tippets. These inventions adequately store hooks with longer tippets, but they fail to keep the tippet straight. Storing longer tippets with these prior art devices creates loops, bends, kinks or coils in the tippet and is contra to providing for a straight tippet.

It is therefore apparent to those skilled in the art that an opportunity exists for providing a new and improved system based on structures that facilitate keeping lined fish hooks tangle free and ready for quick exchange to the main fishing line. No prior art teaches storing each lined fish hook in a separate sleeve where gravity acts on weights attached to the lined end of a fish hook to straighten, hold under tension, and protect the pre-rigged line of a fish hook so that it is free from entanglement. No prior art teaches a lightweight, streamlined carrier for lined fish hooks that can be secured to a fisherman's clothes or waders that conforms to and flexes with the fisherman's physical movements while keeping the lines of lined hooks substantially straight via uninterrupted tension. In addition, no prior art teaches the use of colors or other indicia on either the carrier or integrated with the lined hooks to enable easy locating and changing of the hooks for a fishermen having poor eyesight or limited finger dexterity.

SUMMARY OF THE INVENTION

One aspect of the present invention is directed to a system for managing pre-rigged fish hooks comprising a carrying device including a support structure having a hook retainer end and a line retainer end. The hook retainer end includes a fish hook retainer and the line retainer end includes a plurality of sleeves. Each separate sleeve is for accepting a weight attached to the line of a different pre-rigged fish hook.

Another aspect is directed to a system for managing pre-rigged fish hooks comprising a carrying device including a support structure having a hook retainer on one end and a line retainer on the other end. The hook retainer includes a first set of indicia. The line retainer includes a second set of indicia. The first set of indicia is paired with the second set of indicia to aid a visually impaired fisherman to keep the line of each pre-rigged fish hook untangled along the support structure.

Still another aspect is directed to a system for managing pre-rigged fish hooks comprising a first colored loop on the free end of a pre-rigged fish hook and a second colored loop on the main fishing line. The first and second colored loops aid the fisherman in connecting the pre-rigged fish hook to the main fishing line and also seeing the location of the fish hook in the water.

Yet another aspect is directed to a system for managing pre-rigged fish hooks comprising a carrying device including a support structure having a backside, a hook retainer end and a line retainer end. A first body fastener is attached proximate the hook retainer end on the back side. An elongated element having first and second ends is attached at the first end proximate the hook retainer end on the back side. A slip element is slideably coupled along the elongated element between the first and second ends with a second body fastener attached to the slip element.

Still yet another aspect is directed to a method of managing pre-rigged fish hooks comprising providing a support structure, a weight and a line attached to a pre-rigged fish hook. The support structure has a hook retainer end with a hook retainer and a line retainer end with at least one sleeve. The fisherman secures the pre-rigged fish hook to the hook retainer, attaches the weight to the line, places the weight in a sleeve, and allows gravity to act on the weight to straighten the line.

BRIEF DESCRIPTION OF DRAWINGS

The foregoing and other aspects and advantages of the invention will be apparent from the following detailed description of the invention, as illustrated in the accompanying drawings, in which:

FIG. 1b is a perspective view of the carrying device in FIG. 1a;

FIG. 1c is a back side view of the carrying device in FIG. 1a;

FIG. 1d is a side view of the carrying device in FIG. 1a;

FIG. 8a is a diagram of a pre-rigged fish hook with a first colored loop attached to the hook's line and a separate second colored loop attached to the main line;

FIG. 8b is a diagram of the second colored loop of FIG. 8a being passing through the first colored loop of FIG. 8a;

FIG. 8c is a diagram of the second colored loop of FIG. 8b being placed over the pre-rigged fish hook;

FIG. 8d is a diagram of the second colored loop of FIG. 8c now being pulled back through the first colored loop of FIG. 8c;

FIG. 8e is a diagram of the first and second colored loops of FIG. 8d fully interlocked connecting the pre-rigged fish hook with the main fishing line.

DETAILED DESCRIPTION OF THE INVENTION

Figure 1A:
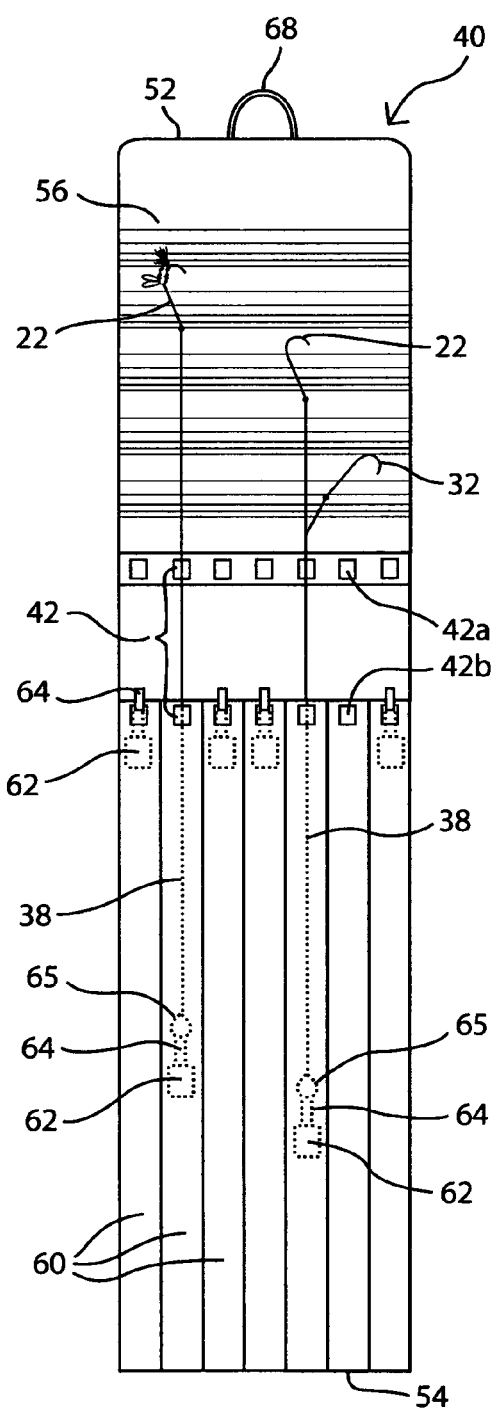
FIG. 1a is a front side view of a fish hook carrying device that is one component of the system for managing pre-rigged fish hooks according the present invention.
Figure 1B:
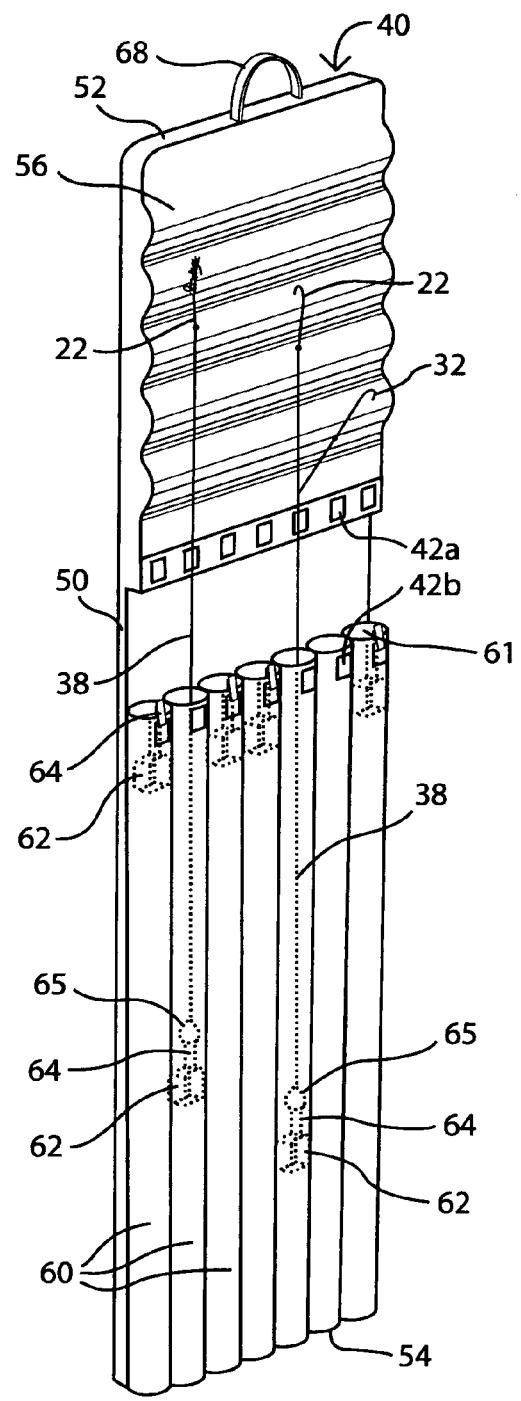
Figure 1C:
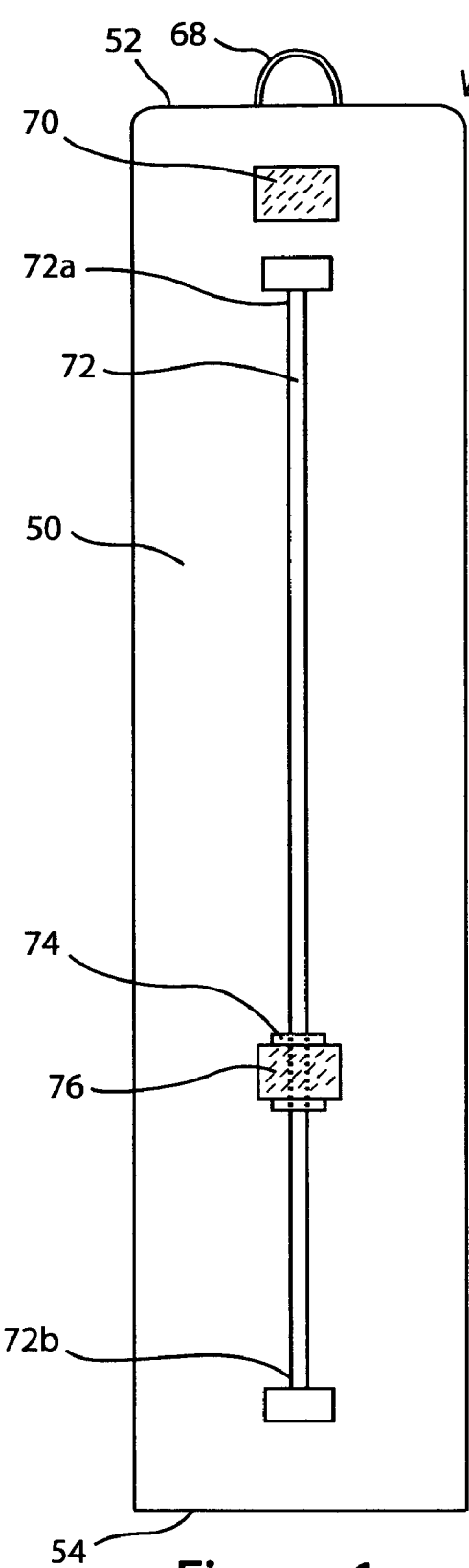
Figure 1D:
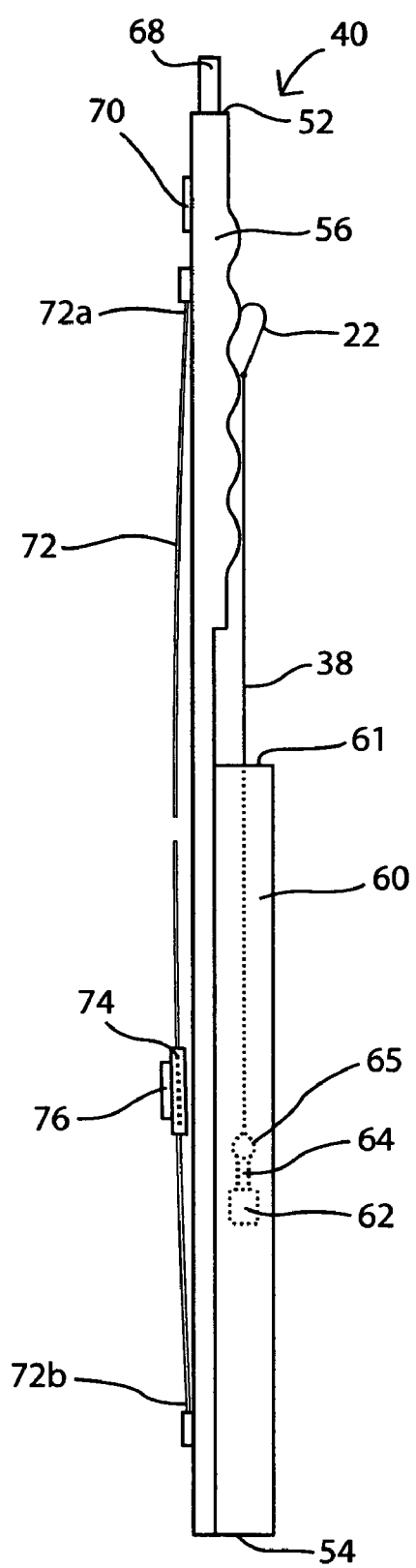
Figures 2A, 2B:
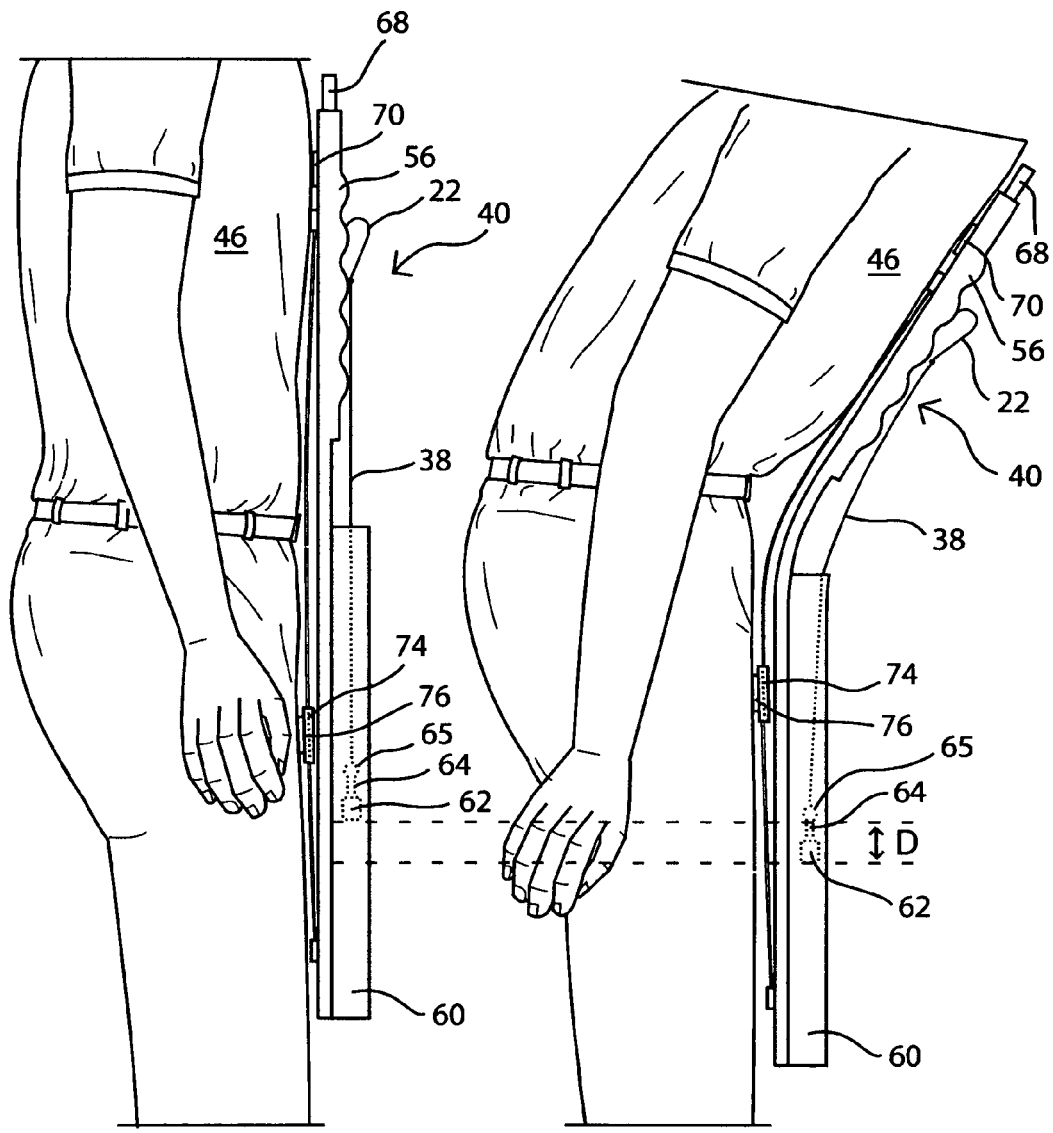
FIG. 2a is a side view of a fisherman illustrating one embodiment of how the carrying device in FIG. 1a may be worn by the fisherman.
FIG. 2b is a side view of a fisherman illustrating how the flexible support structure of the carrying device in FIG. 1a adjusts to conform to the body of the fisherman; as the fisherman flexes, a weight attached to the line provides a constant straightening force on the line.

FIGS. 1-9 illustrate system 20 for managing pre-rigged fish hooks 22 according to the present invention. FIGS. 7a-c show a variety of types of pre-rigged fish hooks 22. During pre-rigging, each fish hook 22 may incorporate some combination of a fly 24, a tippet 26, a snell 28, a dropper hook 32 or any other element necessary for both attaching the hook to the main line 34 and effectively luring a fish 36. For the purposes of this invention, all pre-rigged fish hooks 22 will be considered to have some form of line 38 attached to the fish hook. Line 38 may include a tippet 26, a snell 28, or dropper hook 32. System 20 comprises a fish hook carrying device 40 with optional visual identifiers (pairs of indicia 42 and colored loops 44) to aid a fisherman 46 in rapidly locating and changing lined fish hooks 22.

FIGS. 1-6 are specifically directed to carrying device 40 of the system 20. Carrying device 40 (a.k.a. fish hook carrying device) includes a support structure 50 having a hook retainer end 52 and a line retainer end 54 as shown in FIGS. 1a-d. Hook retainer end 52 includes a fish hook retainer 56. Line retainer end 54 includes a plurality of vertically aligned sleeves 60 that are preferably tubular in shape and have a sleeve opening 61 at their top. Each separate sleeve 60 is for accepting a weight 62 attached to the line 38 of a different pre-rigged fish hook 22. Carrying device 40 is preferably light weight, elongated, flexible and designed to be secured vertically to the upper body of fisherman 46. During use by fisherman 46, each lined hook 22 is protected from entanglement by storing each separate line 38 in its own separate sleeve 60. To do this, each pre-rigged fish hook 22 is first secured by its fish hook to fish hook retainer 56. Weight 62 is then attached proximate the free end of line 38, preferably through the use of a weight fastener 64. Weight 62 is then placed in its own separate sleeve 60. Gravity pulls weight 62 with attached line 38 downward through its substantially vertically oriented sleeve 60 until the line is fully extended such that the weight pulls directly on the secured fish hook 22. The downward force of gravity applies continuous tension on the line and straightens the line. While fisherman 46 is sitting, kneeling, walking, wading or bending over, carrying device 40 conforms to the fisherman's bodily movements and keeps line fish hooks 22 straight and untangled by having gravity continuously pull downward on weight 62 attached to line 38 of the fish hook. FIG. 2b shows how weight 62 drops a distance D within sleeve 60 when fisherman 46 bends. During bending, weight 62 still exerts a continuous force (tension) on line 38 and keeps the line substantially straight or taut. FIG. 2a shows how weight 62 raises a distance D within sleeve 60 when fisherman 46 straightens. During straightening, weight 62 still exerts a continuous force (tension) on line 38 and keeps the line substantially straight or taut. Therefore each weight 62 moves up and down freely within sleeve 60 in response to the bodily movements of the fisherman 46. If desired, a flap, pouch or other flexible covering can be used to encase carrying device 40 to protect exposed hooks and sections of line 38 from being snagged when the fisherman opts to travel through thickets or the like.

Figures 4A, 4B:
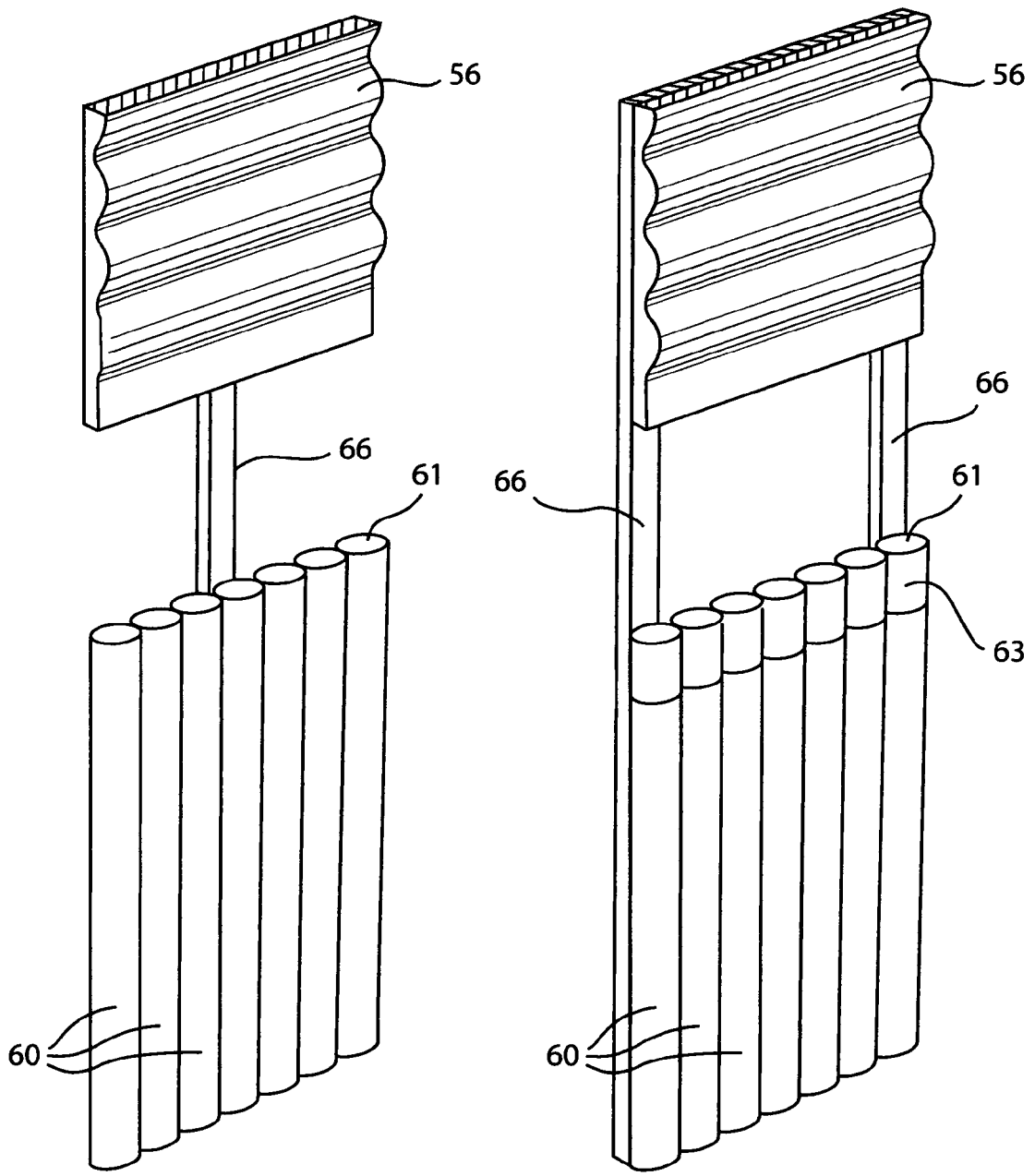
FIG. 4a is a perspective view of one embodiment where a single backbone is integrated with the support structure.
FIG. 4b is a perspective view of another embodiment where more than one backbone is integrated with the support structure.
Figure 5:
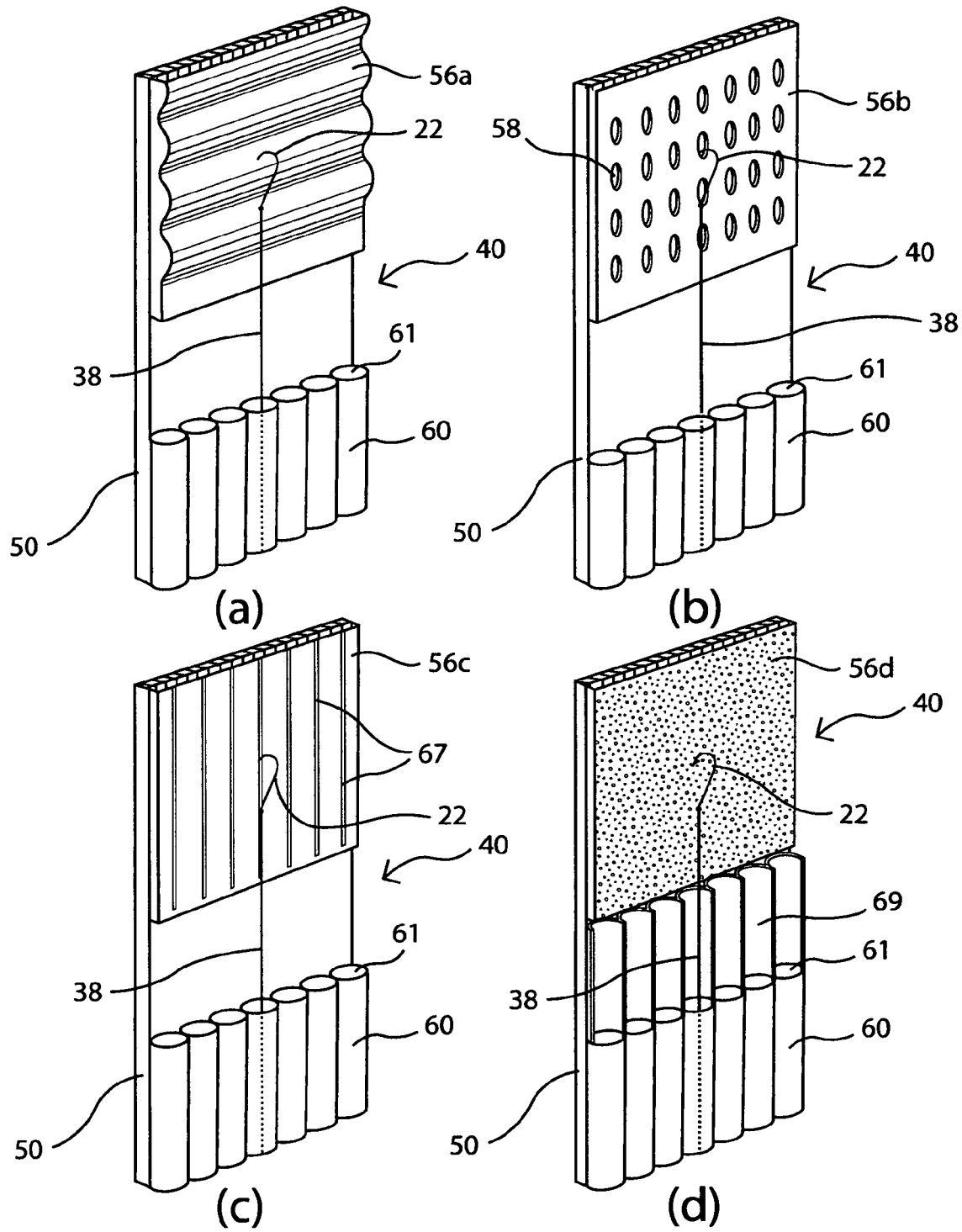
FIG. 5a is a perspective view of the middle region of a carrying device that includes a hook retainer having a ribbed surface for helping secure fish hooks.
FIG. 5b is a perspective view of the middle region of a carrying device that includes a hook retainer having holes for securing fish hooks.
FIG. 5c is a perspective view of the middle region of a carrying device that includes a hook retainer having slots for securing fish hooks.
FIG. 5d is a perspective view of the middle region of a carrying device that illustrates a magnetic hook retainer and line guiding element for securing lined fish hooks.
Figure 6:
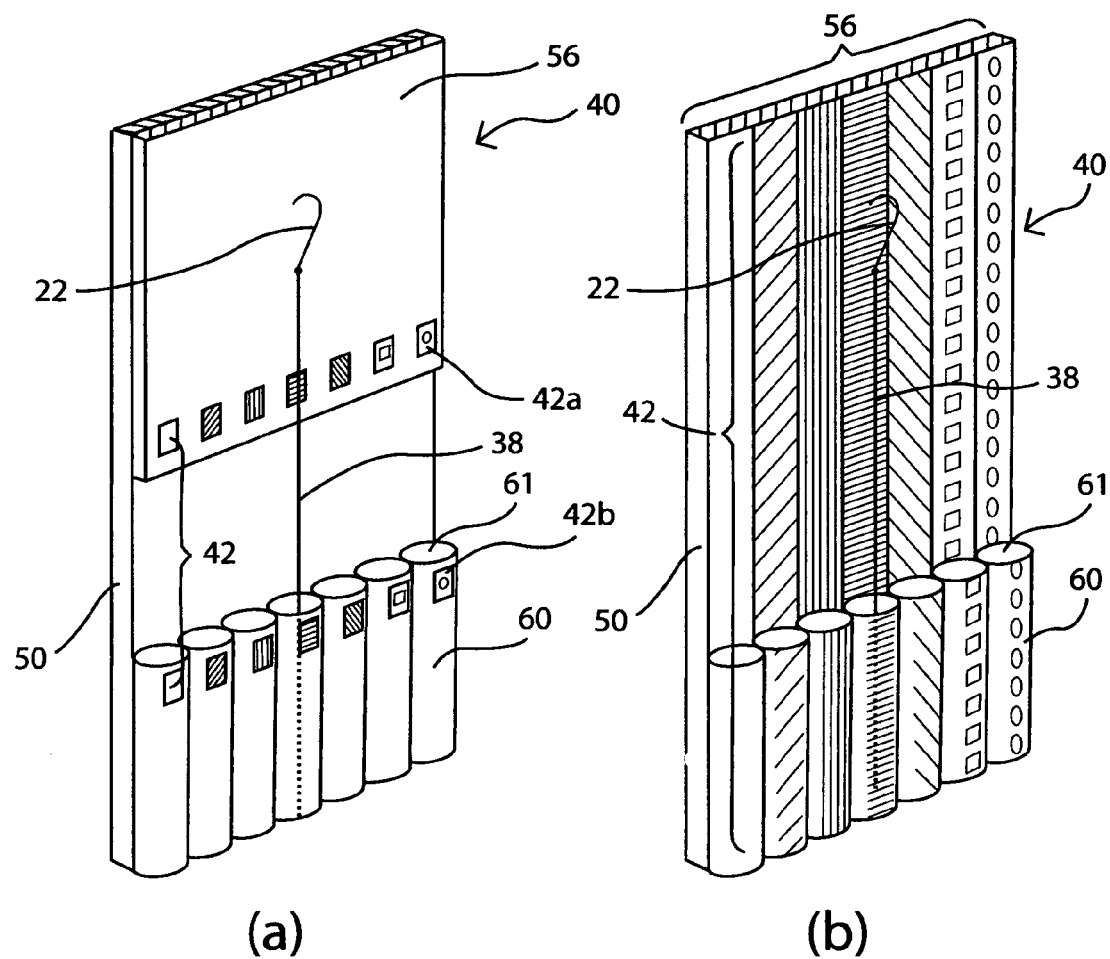
FIG. 6a is a perspective view of a section of a carrying device illustrating a first set of indicia on the hook retainer and a corresponding second set of indicia on the sleeves, each pair of indicia helps the fisherman align a pre-rigged hook from the hook retainer to a given sleeve.
FIG. 6b is a perspective view of a section of a carrying device illustrating continuous indicia from said hook retainer to corresponding separate sleeves.
Figure 7:
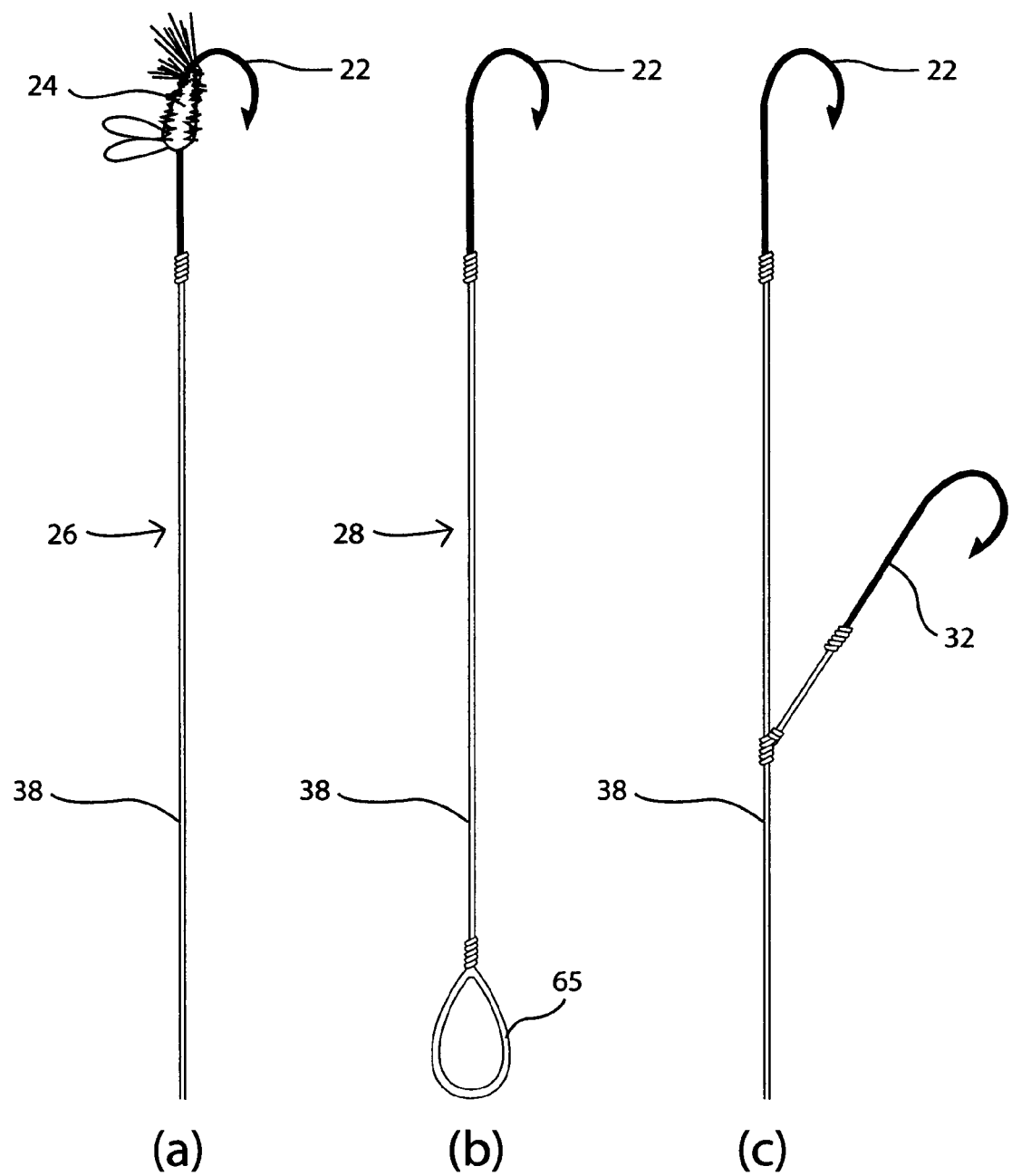
FIG. 7a is a diagram of a pre-rigged fish hook including a tippet and fly.
FIG. 7b is a diagram of a pre-rigged fish hook including a snell.
FIG. 7c is a diagram of a pre-rigged fish hook including a dropper hook.
Figure 8:
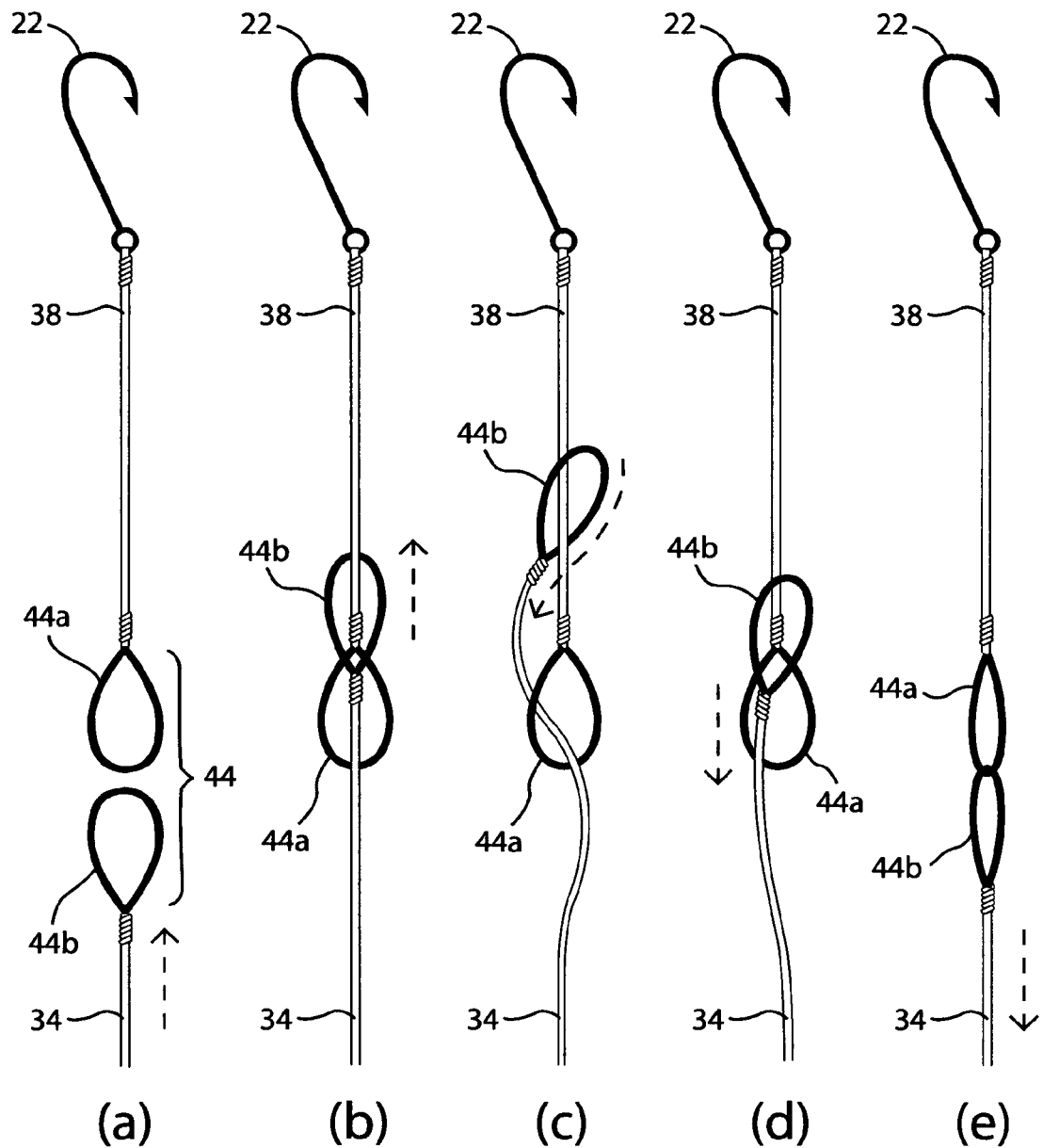

Turning now to specific features of fish hook carrying device 40. Support structure 50 is preferably a flexible support structure that conforms to the body and bodily movements of fisherman 46. Support structure 50 may be fabricated as one integral piece incorporating both the fish hook retainer 56 and the plurality of sleeves 60. Alternatively, support structure 50 may be fabricated from separate pieces that integrate with the hook retainer 56 and the plurality of sleeves 60 to create fish hook carrying device 40. For example, in FIGS. 1a-d support structure 50 is one integral piece of material extending from hook retainer 56 to sleeves 60 that are mounted at line retainer end 54. Alternatively as shown in FIGS. 4a and 4b, support structure 50 is comprised of one or more backbones 66 supporting hook retainer 56 and supporting sleeves 60. Support structure 50 may further include a hanger 68 for hanging fish hook carrying device 40 when not attached to fisherman 46.

Each sleeve 60 is a structure with an open end at the top and an optional open end on the bottom. The inside diameter of sleeve 60 is large enough for fisherman 46 to easily drop in weight 62 that is connected to line 38 of pre-rigged fish hook 22. Sleeves 60 are preferably tubular with a circular cross-section, but could take on any cross-sectional shape that would accept weight 62. Sleeves 60 have a sidewall that circumscribes a hollow space therein. Sleeves 60 are preferably constructed of a pliable, elastic material that can be bent or folded repeatedly without creasing, breakage or material fatigue. This elasticity is important for two reasons. First, it enables fisherman 46 to wear fish hook carrying device 40 comfortably without restricting his physical activity such as walking, wading, leaning over or otherwise flexing his body. Second, the elasticity of the sleeve material prevents the formation of creases or wrinkles in sleeves 60 that could interfere with the unrestricted free fall of weight 62 attached to line 38. Examples of possible materials for sleeves 60 include plastic, cloth, vinyl, leather, nylon, rubber or any other elastic material. To facilitate the accurate placement and unobstructed downward fall of weight 62 being lowered into sleeve opening 61, the sleeve opening can also be stiffened, enlarged or held open near the sleeve opening by means such as gluing, taping, impregnating the sleeve openings with a stiffening agent, using an insert, outside frame or spring-like device. The portion of sleeve 60 near sleeve opening 61 may also be a separate sleeve opening element 63 as shown in FIG. 4b.

Any number of fish hook retainers 56 may be integrated with hook retaining end 52 of carrying device 40. For example, hook retainer 56 may be foam, snaps, coils, magnets, fur, clips, cork or other material. FIG. 5a shows one embodiment in which the fish hook retainer 56a is a ribbed sheet of foam. Each pair forms one of a plurality of alignment regions running from fish hook retainer 56 to the fish line retainer, where each region aids a visually impaired fisherman to keep the fish line of each pre-rigged fish hook untangled along the support structure. Fish hooks 22 can be inserted into each foam rib. FIG. 5b shows another embodiment in which fish hook retainer 56b comprised of a rigid or semi-rigid material with holes cut in it. The pointed end of each fish hook 22 is inserted into a hole 58. FIG. 5c shows another embodiment in which fish hook retainer 56c is comprised of a set of vertical slots 67 aligned with the opening 61 of each vertical sleeve 60. Fish hook 22 is secured by placing its pointed end into slot 67 and line 38 placed in a sleeve 60 with weight 62. FIG. 5d shows another embodiment in which fish hook retainer 56d is comprised of a material such as a magnet to secure fish hooks.

Fish hook carrying device 40 may further include a line guiding element 69 extending between the bottom of hook retainer 56 and each opening 61 of the plurality of sleeves 60. Line guiding element 69 may be a series of vertically oriented ridges and valleys, or other appropriate material or mechanism, that act to further separate lines 38 from tangling with each other. Line guiding element 69 may also be structured to prevent line 38 from bowing outward when the fisherman bends over. FIG. 5d illustrates one embodiment of a line guide element 69 integrated with carrying device 40.

Figure 3:
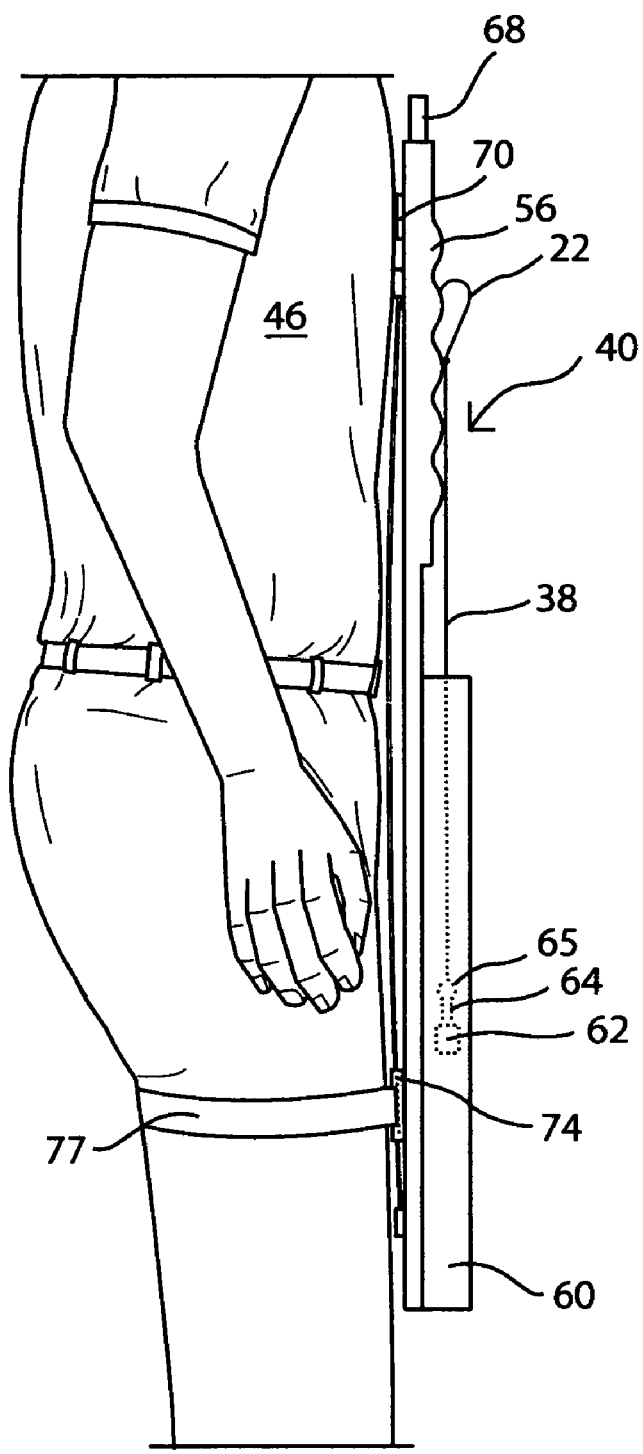
FIG. 3 is a side view of a fisherman illustrating an alternative embodiment of how the carrying device may be attached to the fisherman.

Fish hook carrying device 40 may include a variety of fasteners for attaching the carrying device to a fisherman 46. In a preferred embodiment that allows for conformal movement of carrying device 40 to the body of the fisherman, FIGS. 1c and 1d, the carrying device includes a first body fastener 70 located adjacent hook retainer end 52 on the back side of support structure 50. This first fastener 70 is designed for securing carrying device 40 to the upper chest of fisherman 46. One or more elongated elements 72, each having a first end 72a and a second end 72b, is provided with the first end located adjacent hook retainer end 52 on the backside of carrying device 40 and below first body fastener 70. The second end 72b is located on the backside adjacent line retainer end 54. First body fastener 70 is located between fish hook retainer end 52 and first end 72a of elongated element 72. Elongated element 72 is preferably a flexible elongated element. Elongated element 72 is oriented parallel with tubular sleeves 60. Elongated element 72 further has slip element 74 that is slideably coupled along the length of elongated element between first end 72a and second end 72b. A second body fastener 76 is attached to slide with slip element 74. This second body fastener 76 is designed for attachment on a lower portion of the fisherman's body, for example on the waders. When fisherman 46 flexes at waist level, slip element 74 freely slides up elongated element 72 allowing carrying device 40 to move downward slightly. This action provides for reduced buckling, smoother flexing and better conformality of carrying device 40 to the fisherman's body. FIG. 3 illustrates an alternative embodiment for second body fastener 76, here the second body fastener is a strap 77 that goes around the leg and is secured using VELCRO® or other alternate closure device. In yet another embodiment, second body fastener 76 may be configured to move up and down relative to the fisherman's body.

System 20 includes a separate weight 62 for each separate sleeve 60. Each weight 62 has a diameter that is smaller than the inside diameter of each sleeve 60. Each weight 62 is preferably made of a heavy material such as lead or more ecologically friendly materials such as tin or iron. Each weight 62 is preferably integrated with a weight fastener 64 to aid fisherman 46 in attaching the weight to line 38 of pre-rigged fish hook 22. The free, lined end of each pre-rigged fish hook 22 preferably has a loop 65. Weight fastener 64 may be a plastic clip that easily slips through loop 65 of line on the end of pre-rigged fish hook 22, FIG. 1a, or the weight fastener may be some other fastening means.

For a visually impaired fisherman, for example an older fisherman who can no longer focus close up, visual identifiers may be incorporated into system 20 to make it easier for the fisherman 46 to align hooks to their proper sleeves 60. For example as shown in FIG. 6a, a first indicia 42a is provided on hook retainer 56 that corresponds to a second indicia 42b on the line retainer end (e.g. sleeve 60). First indicia 42a and second indicia 42b together form a pair of indicia 42. Each pair forms one of a plurality of alignment regions running from fish hook retainer 56 to the fish line retainer, where each region aids a visually impaired fisherman to keep the fish line of each pre-rigged fish hook untangled along the support structure. These indicia may be any marking that provides the fisherman with easier alignment from where fish hook 22 is retained to where the line must enter sleeve opening 61.

Markings such as different bright colors and patterns can be visually/spatially distinguished even with poor focusing. Such indicia would allow the visually impaired fisherman to secure a lined hook 22 to hook retainer 56 and then easily find an identical indicia on the openings of sleeves 60, thus lining up line 38 to the proper sleeve 60 to keep the line straight and untangled. Each pair of indicia 42 may also be continuous indicia from hook retainer 56 to a corresponding separate sleeve 60, FIG. 6b. It is understood that this use of visual indicia may be incorporated into other systems for carrying fish hooks without deviating from the scope of this invention. For example, the line retainer end may include other types of line retainers other than sleeves 60.

Fine, transparent fishing line can be difficult to see even for a fisherman with good eyesight. For an older fisherman who cannot see close up, connecting the free end of fish line from a pre-rigged hook to the main line by tying a knot can be close to impossible without corrective lenses. It is therefore another feature of system 20 for managing pre-rigged fish hooks to provide colored loops 44 of fish line on both the pre-rigged hook 22 (first colored loop 44a) and main fishing line 34 (second colored loop 44b). Colored fishing line is easier to see than transparent line. Pre-fabricated loops also make it easier to connect and disconnect lines rather than tying a knot from scratch while out fishing. Memory-free loops of material of contrasting colors that are permanently attached to the free end of each line are easily disengaged from one another when joined by a loop-to-loop connection. The loops of contrasting color can be closed and tightened to mimic unobtrusive single strands. The tightened loops can then be opened and loosened easily when a fisherman wishes to replace one pre-rigged hook with another. FIGS. 8a-8e illustrate the manner in which a pre-rigged fish hook 22 can be quickly connected to main fishing line 34. FIG. 8b, second colored loop 44b on main fishing line 34 is inserted through first colored loop 44a of pre-rigged fish hook 22. FIG. 8c, second colored loop 44b is then placed over pre-rigged fish hook 22. FIG. 8d, second colored loop 44b is then pulled back through first colored loop 44a. FIG. 8e, first and second colored loops are fully interlocked to connect pre-rigged fish hook 22 to main fishing line 34. In fly fishing, especially with small flies, the colored loops will also provide the fisherman another visual option for locating the approximate location of fish hook 22.

Figure 9:
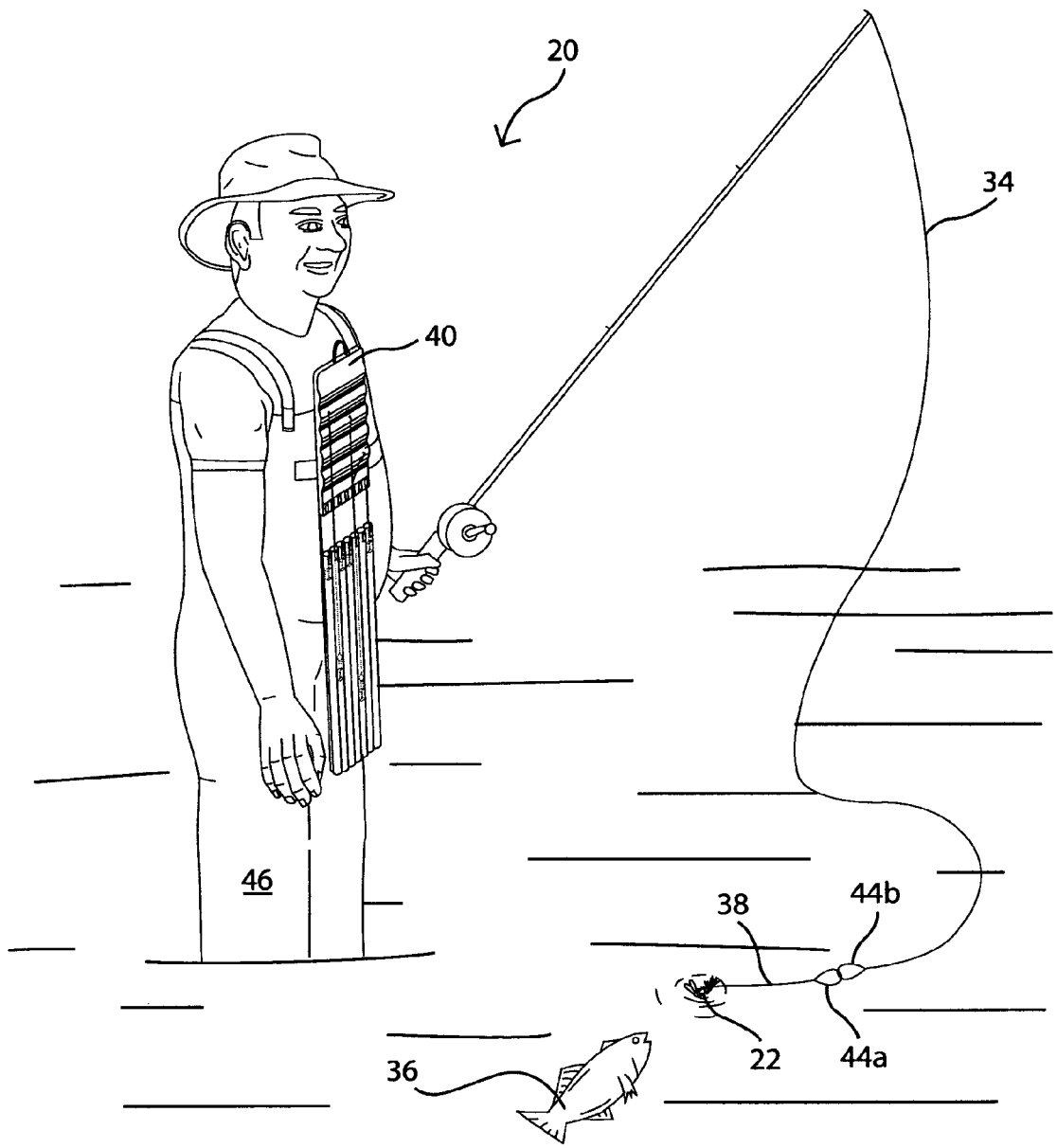
FIG. 9 is a diagram of the system for managing pre-rigged fish hooks when in use by a fisherman standing in water.

FIG. 9 is a diagram of system 20 for managing pre-rigged fish hooks 22 incorporating all of the components of the system. System 20 with all its components may be used as follows. A fisherman stocks carrying device 40 with pre-rigged fish hooks 22 before going fishing. Attaching a line such as a tippet 26, a snell 28 or leader is much easier when fisherman 46 is not fishing because lighting, magnification and all aspects of a knot-tying task can be optimized by the fisherman. In fact, by preparing pre-rigged fish hooks 22 ahead of a fishing outing, fisherman 46 can have someone else tie knots for him. If desired, colored loops 44a and 44b may be added to the end of lined fish hook 22 and main fishing line 34 respectively. To store pre-rigged hook in a sleeve 60 of carrying device 40, the carrying device is first hung vertically by its hanger 68. Fish hook 22 is secured to hook retainer 56. Weight 62 is attached to line 38 by weight fastener 64 and the weight lowered into opening 61 of an unoccupied sleeve 60. Sleeve 60 is preferably directly vertically under where hook 22 is secured. The pairs of indicia 42 may be used to aid in guiding hook 22 from hook retainer 56 to sleeve 60. Gravity pulls the freefalling weight 62 and line 38 downward through sleeve 60 until the line is fully extended. Line 38 of pre-rigged hook 22 is now protected from entanglement by being stored in its own separate sleeve 60. This sequence of operations is replicated with other pre-rigged hooks. Once fisherman 46 has stored all pre-rigged hooks 22 that he or she might wish to use when fishing, carrying device 40 is secured to a desired location on the fisherman by one or more body fasteners (first body faster 70 or second body fastener 76). Alternatively, carrying device 40 may be hung on the vertical or slanted side of a dock, pier, boat or other nearby surface. The fisherman selects and removes desired hooks 22 from carrying device 40 by pulling line 38 and weight 62 up through sleeve 60 until the line with the attached weight is completely free of sleeve 60. The fisherman removes weight 62 from line 38 and attaches the lined hook 22 to main fishing line 34. If colored loops 44a and 44b are used, the colored loops may be used to aid in connecting pre-rigged fish hook 22 to main line 34 and act as a visual aid in viewing the placement of the pre-rigged fish hook in the water after casting the line. If fisherman 46 wishes to change pre-rigged fish hook 22 with a different pre-rigged fish hook, the fisherman stores the pre-rigged fish hook in the vacated sleeve using the visual indicia to help locate the vacated sleeve. Use of system 20 for managing pre-rigged fish hooks 22 thus facilitates, simplifies and expedites the changing of the pre-rigged fish hooks and dropper hooks 32. System 20 enables the fisherman to go fishing without rigging material, hook boxes, clippers, line straighteners or other paraphernalia. If desired, however, various clips, straps, rings, clasps and other attachment devices can be added to carrying device 40 to hold accessories.

The invention is not limited to the embodiments represented and described above but includes all variants, notably those concerning the manner in which the fish hook carrying device is used. For example, the fish hook carrying device may be integrated into a shirt, vest, pack or waders worn by the fisherman; or even used for displaying pre-rigged hooks in stores. The invention is also not limited to carrying the hooks and flies shown, but could include any lure or accessory used in rigging hooks. The invention is also not limited to the hook retainers shown, but may incorporate any structure for retaining a fish hook. Nothing in the above specification is intended to limit the invention more narrowly than the appended claims. The examples given are intended only to be illustrative rather than exclusive.

What is claimed is:

1. A system for managing pre-rigged fish hooks attached to fish line, comprising:

a) a carrying device including a support structure that conforms to bodily movements of a fisherman, said support structure having a fish hook retainer end and a fish line retainer end, wherein said fish hook retainer end includes a fish hook retainer, wherein said fish line retainer end includes a plurality of tubular sleeves, wherein each tubular sleeve has a sidewall circumscribing a hollow space therein, wherein each tubular sleeve is an elastic tubular sleeve;

b) a first body fastener secured proximate to said fish hook retainer end for attaching said support structure to the fisherman; and c) a separate weight for each separate tubular sleeve, whereby when said separate weight is attached to the fish line of a pre-rigged fish hook retained by said fish hook retainer said separate weight moves up and down freely within said separate tubular sleeve in response to the bodily movements of the fisherman only under the force of gravity keeping the fish line substantially straight.

2. A system as recited in claim 1, whereby when said separate weight is attached to the fish line of the pre-rigged fish hook, said separate weight provided a constant straightening force on the fish line when said carrying device is flexed by the fisherman.

3. A system as recited in claim 1, further comprising a weight fastener for attaching said separate weight to the fish line of the pre-rigged fish hook.

4. A system as recited in claim 1, wherein the pre-rigged fish hook is at least one from the group including a tippeted hook, a leadered hook, a snelled hook and a dropper hook.

5. A system as recited in claim 1, wherein said carrying device further included a first indicia on said fish hook retainer paired to a second indicia on a specific tubular sleeve forming a pair of indicia, wherein said first and second indicia together aid a visually impaired fisherman in aligning each different pre-rigged fish hook.

6. A system as recited in claim 5, wherein said pair of indicia are continuous indicia from said hook retainer to a corresponding separate sleeve.

7. A system as recited in claim 1, further comprising a first colored loop on a free end of the pre-rigged fish hook and a second colored loop on a main fishing line, wherein said second colored loop has a color that contrasts with a color of the first colored loop, wherein the contrast in color between the first colored loop and second loop aids the fisherman in connecting the pre-rigged fish hook to the main fishing line.

8. A system as recited in claim 7, wherein said first and second colored loops aid the fisherman in seeing a location of the lined fish hook in the water.

9. A system as recited in claim 1, further including a backbone integrated with said support structure.

10. A system for managing pre-rigged fish hooks attached to fish line, comprising:
a) a carrying device including a support structure having a fish hook retainer end and a fish line retainer end, wherein said fish hook retainer end includes a fish hook retainer, wherein said fish line end includes a plurality of tubular sleeves, wherein each tubular sleeve has a side wall circumscribing a hollow space therein;
b) a first body fastener secured proximate to said fish hook retainer end for attaching said support structure to a fisherman;
c) a separate weight for each separate tubular sleeve, whereby when said separate weigh is attached to the fish line of a pre-rigged fish hook retained by said fish hook retainer said separate weight moves freely within said separate tubular sleeve only under the force of gravity keeping the fish line substantially straight; and
d) an elongated element having a first end and a second end, wherein said first end attaches proximate said fish hook retainer end, wherein said elongated element is oriented parallel with said tubular sleeves, wherein a slip element is slideably coupled along said elongated element, and wherein a second body fastener is attached to said slip element.

\* \* \* \* \*